United States Patent Office 3,629,158
Patented Dec. 21, 1971

3,629,158

PROCESS FOR CONTROLLING ELECTRICAL RESISTIVITY OF ORGANIC SEMICONDUCTORS

Evelio A. Perez-Albuerne, Rochester, N.Y., assignor to Eastman Kodak Company, Rochester, N.Y.

No Drawing. Filed Sept. 10, 1969, Ser. No. 856,837
U.S. Cl. H01l 3/24
U.S. Cl. 252—500 15 Claims

ABSTRACT OF THE DISCLOSURE

The electrical resistivity of certain organic semiconductors and semiconductor-containing elements is controlled by heating.

This invention relates to a process for varying the electrical resistivity of certain organic semiconductors and film containing these materials.

The usefulness of semiconducting organic materials is associated to a large extent with a combination of properties such as (1) desirable electronic properties (e.g., low electrical resistivity), (2) chemical stability, and (3) physical and chemical properties which would permit the preparation of useful articles of manufacture. The first two properties mentioned above are shared by a number of inorganic materials well known in the art, such as metals (e.g., silver, copper) or inorganic semiconductors (e.g., germanium, silicon). However, the great chemical versatility of organic molecules gives the organic semiconductors a distinct advantage over inorganic materials to the extent that it is possible to introduce and modify physical and chemical properties such as solubility, melting piont, etc., by relatively minor changes in the chemical structure of the organic molecules. In other words, the oganic semiconductors open the possibility for tailor-made electrically-conducting materials with properties not found in inorganic substances.

The preparation of organic materials showing appreciable electrical conductivity has been the subject of several publications and reviews. They may be classified in four broad groups:

(1) Non-complex organic semiconductors, consisting of single monomeric species. (The term "semiconductor" as used herein describes electrically-conducting materials with a resistivity in the range $10^{-3}$ to $10^{-9}$ ohm-cm.)

(2) Complex organic semiconductors, consisting in general of at least two monomeric species (comprising an electron donor moiety and an electron acceptor moiety, respectively) associated to a certain extent through charge transfer.

(3) Non-complex polymeric organic semiconductors.

(4) Complex organic semiconductors where at least one of the electron donor moieties or the electron acceptor moieties is attached to, or part of a polymeric chain.

Most of the known organic semiconductors, showing resistivity values lower than $10^4$ ohm-cm., belong to the second and fourth categories, but many of these are unstable under ambient conditions, hence reducing their usefulness considerably. Furthermore, those which show reasonable stability are usually obtained in the form of insoluble, infusable powders, which in general are not amenable to fabrication into useful articles of manufacture.

In more recent publications (e.g., Y. Matsunaga, J. Chem. Phys. 42, 2248 (1965) and Y. Okamoto, S. Shah, and Y. Matsunaga, J. Chem. Phys., 43, 1904 (1965)) new organic semiconductors of low resistivity have been described in which a sulfur-containing polycyclic hydrocarbon (tetrathiotetracene) acts as electron donor in dative-type charge transfer complexes with any one of three organic acceptors: o-chloranil, o-bromanil and tetracyanoethylene. (The term "dative-type charge transfer complex" describes a charge transfer complex between an electron donor and an electron acceptor in which the constituents are in an ionized form in the ground state of the complex.) These complexes may also be designated by the term "ion-radical salts," the electron donor becoming the "cation-radical" and the acceptor becoming the "anion-radical." The described complexes, however, lack solubility in organic solvents as well as in water. Likewise, tetrathiotetracene itself, although showing one of the lower electrical resistivities of the non-complex organic semiconductors reported (specific resistivity of the compressed powder is of the order of $10^4$ ohm-cm.), is only very slightly soluble at room tempearture in a few very strong organic solvents.

In U.S. Ser. No. 851,088 filed Aug. 18, 1969 by E. A. Perez-Albuerne, are described certain Group VI*a* element-containing polycyclic hydrocarbon complexes which are useful as organic semiconductors. These materials are distinguishable from those described in the preceding paragraph in that they are either soluble in ordinary solvents, or can be readily prepared from soluble derivatives, and thus can be fabricated into useful coatings, films, etc. The surface resistivity of films of these materials is generally less than $10^{11}$ ohms/square depending on the composition of the semiconductor. It is often desirable to change the surface resistivity of a film without having to prepare a different semiconductor and film which would have the desired surface resistivity.

It is therefore an object of this invention to provide novel process for controlling the electrical resitivity of of a certain class of organic semiconductors.

It is a further object of this invention to provide a novel process for controlling the elerctcal resistivity of elements containing a certain class of organic semiconductors.

It is yet another object of this invention to provide semiconductor elements having a controlled electrical resistivity.

These and other objects of the invention are accomplished by heating an organic semiconductor having an electron donating moiety (including a cation-radical derived therefrom) which is derived from a polycyclic aromatic hydrocarbon having at least two positions joined by a bridge containing 2 to 4 atoms of a Group VI*a* element (e.g.) sulfur, selenium, tellurium, etc.), and an electron acceptor moiety (including an anion derived therefrom) which is either inorganic or organic. The semiconductor can also contain combined neutral species of the material from which the cation is derived. The polycyclic aromatic hydrocarbon generally contains 2 to 6 fused rings. It has been found that heating causes a decrease in the electrical resistivity of the semiconductor. A significant advantage resides in the ability to precisely control the surface resistivity of a semiconductor element containing a layer of a semiconductor on a supporting substrate. Thus, such an element can be initially prepared having the desired resistivity or an element which has been in use can have its surface resistivity decreased by heating.

Decreases in electrical resistivity result when the semiconductor or an element containing a layer of the semiconductor is heated at a temperature from about 50° C. to about 200° C. for a period from about 5 seconds to about 2 hours. The preferred temperature range for heating is from about 90° C. to about 130° C. and the preferred heating time is from about 15 seconds to about 10 minutes or more. The correlation between heating temperature and time for a number of the materials described herein is such that a fixed decrease in the electrical resistivity of the semiconductor is obtainable either by using relatively higher temperatures and shorter times or by using relatively lower temperatures and longer times.

The semiconductors useful in this invention have the following formula:

$$(D)_k^{o}(D^{+n})_m(Z^{-p})_q$$

wherein:

D represents a fused polycyclic aromatic hydrocarbon moiety containing 2 to 6 fused aromatic rings having at least two positions joned by a bridge containing 2 to 4 atoms of a Group VI*a* element such as sulfur, selenium, tellurium, etc. (Handbook of Chemistry and Physics, 38th edition, pp. 394–95), including substituted polycyclic aromatic hydrocarbons containing such bridges such as a tetrathiotetracene moiety, a hexathiopentacene moiety, a tetraselenotetracene moiety, a hexaselenopentacene moiety, a tetratellurotetracene moiety, a hexatelluropentacene moiety, etc., wherein each of the above-described moieties include substituted as well as unsubstituted forms, typical substituents being in the aromatic nucleus and including one or more alkyl groups, aryl groups, alkoxy groups, hydroxy groups, carboxy groups, halogen groups, amino groups, acyl groups, aryloxy groups, etc.;

Z represents one or more electron accepting anions including (a) inorganic anions such as iodide, thiocyanate, fluoroborate, ferricyanide, molybdate, tungstate, etc.

(b) monomeric organic anions derived from monomeric organic acids such as aromatic carboxylic acids, e.g., benzoic, phthalic, terephthalic, pyromellitic, gallic, naphthoic, naphthalene dicarboxylic, naphthalene tetracarboxylic, etc.; aliphatic monocarboxylic acids such as acetic, dichloroacetic, propionic, methoxyacetic, butyric, etc.; aliphatic dicarboxylic acids such as oxalic, malonic, succinic, glutaric, etc.; aliphatic polycarboxylic acids such as citric acid; unsaturated carboxylic acids such as acrylic, maleic, fumaric, muconic, acetylenedicarboxylic, etc.; sulfonic acids such as sulfonic, p-toluene sulfonic, naphthalene sulfonic, naphthol disulfonic, methyl sulfonic, etc.; heterocyclic acids wherein the heterocyclic nucleus contains 5 to 6 atoms including one or more nitrogen, oxygen or sulfur atoms such as barbituric, cyanuric, thiobarbituric, quinolinic, chelidonic, etc.;

(c) polymeric anions derived from anion-furnishing organic polymers such as poly(vinyl methyl ethermaleic anhydride), polyacrylic acid, sulfonated polystyrene, poly(methyl methacrylate-methacrylic acid), poly(ethyl acrylate-acrylic acid), poly(ethylene-maleic acid), etc.;

$-p$ is the formal negative charge on each of the Z anions present;

$q$ is the number of Z anions present;

$(D)^{o}$ represents a combined neutral D moiety;

$n$ is the formal positive charge on each D cation;

$m$ represents the number of D cations present; and $k$ represents the number of (D) neutral moieties present.

In the above formula, Z can be the same or different anions, $-p$ being the charge on each one of the anions. Of course, $-p$ and $q$ can be different for each of the anions when a mixture of anions is present. When Z is an inorganic anion or a monomeric organic anion derived from a monomeric organic acid, $p$ is typically an integer from 1 to 6. When Z is a polymeric anion derived from anion-furnishing organic polymers, $p$ can be 100 or greater depending on the number of anion centers present in the polymer chain which, in turn, is dependent upon the molecular weight of the polymer. The number of Z anions present, $q$, generally can be from 1 to about 6. The number of $D^{+n}$ cations, $m$, generally ranges from 1 to about 6, and can be a mixture of different cation species derived from various polycyclic aromatic hydrocarbon materials. The formal positive charge on each D cation, $+n$, can be from 1 to 6. The number of $D^{o}$ combined neutral moieties, $k$ is generally from zero to about 5, and not necessarily an integer. $D^{o}$ can also be a mixture of neutral polycyclic aromatic hydrocarbon moieties. The semiconductors described herein are electrically balanced so that $nm$ is equal to $pq$. When a mixture of cations and/or anions is present, each of these expressions stands for the sum of such products over all the moieties present. The total number of D moieties present is equal to $(m+k)$.

The cation or neutral species of the above formula are preferably derived from compounds having one of the following formulae:

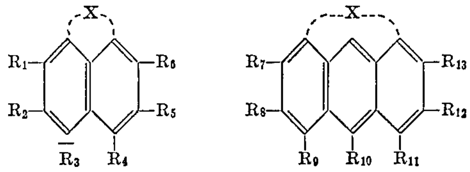

I II wherein:

X represents a bridge containing 2 to 3 sulfur, tellurium, or selenium atoms;

$R_1$ through $R_{13}$ represent any of the following (a) a hydrogen atom, (b) an alkyl group having 1 to 18 carbon atoms e.g., methyl, ethyl, propyl, butyl, isobutyl, octyl, dodecyl, etc., including a substituted alkyl group having 1 to 18 carbon atoms such as

- (a) alkoxyalkyl e.g., ethoxypropyl, methoxybutyl, propoxymethyl, etc.,
- (b) aryloxyalkyl e.g., phenoxyethyl, naphtoxymethyl, phenoxypentyl, etc.,
- (c) aminoalkyl e.g., aminobutyl, aminoethyl, aminopropyl, etc.,
- (d) hydroxyalkyl e.g., hydroxypropyl, hydroxyoctyl, hydroxymethyl, etc.;
- (e) aralkyl e.g., benzyl, phenylethyl, etc.,
- (f) alkylaminoalkyl e.g., methylaminopropyl, methylaminoethyl, etc., and also including dialkylaminoalkyl e.g., diethylaminoethyl, dimethylaminopropyl, propylaminooctyl, etc.;
- (g) haloaminoalkyl e.g., dichloroaminoethyl, N-chloro-N-ethylaminopropyl, bromoaminohexyl, etc.;
- (h) arylaminoalkyl, e.g., phenylaminoalkyl, diphenylaminoalkyl, N-phenyl-N-ethylaminopentyl, N-phenyl-N-chloroaminohexyl, naphthylaminomethyl;
- (i) nitroalkyl e.g., nitrobutyl, nitroethyl, nitrophentyl, etc.
- (j) cyanoalkyl, e.g., cyanopropyl, cyanobutyl, cyanoethyl etc.
- (k) haloalkyl e.g., chloromethyl, bromopentyl, chlorooctyl, etc.
- (l) alkyl substituted with an acyl group having the formula $$-\overset{\overset{\large O}{\|}}{C}-R$$

wherein R is hydroxy, halogen e.g., chlorine, bromine, etc., hydrogen, aryl, e.g., phenyl, naphthyl, etc., lower alkyl having 1 to 8 carbon atoms e.g., methyl, ethyl, propyl, etc., amino including substituted amino e.g., diloweralkylamino, lower alkoxy having 1 to 8 carbon atoms e.g., butoxy, methoxy, etc., aryloxy, e.g., phenoxy, naphthoxy etc.;

(c) an aryl group e.g., phenyl, naphthyl, anthryl, fluoronyl, etc. including a substituted aryl group such as

- (a) alkoxyaryl e.g., ethoxyphenyl, methoxyphenyl, propoxynaphthyl, etc.;
- (b) aryloxyaryl e.g., phenoxyphenyl, naphthoxyphenyl, phenoxynaphthyl etc., (c) aminoaryl e.g., aminophenyl, aminonaphthyl, aminoanthryl, etc.,
(d) hydroxyaryl e.g., hydroxyphenyl, hydroxynaphthyl, hydroxyanthryl, etc.,
(e) biphenylyl,
(f) alkylaminoaryl e.g., methylaminophenyl, methylaminonaphthyl, etc. and also including dialkylaminoaryl e.g., diethylaminophenyl, dipropylaminophenyl, etc.,
(g) haloaminoaryl e.g. dichloroaminophenyl, N-chloro-N-ethylaminophenyl, brominophenyl, etc.,
(h) arylaminoaryl e.g., phenylaminophenyl, diphenylaminophenyl, N-phenyl-N-ethylaminophenyl, N-phenyl-N-chloroaminophenyl, naphthylaminophenyl, etc.,
(i) nitroaryl e.g., nitrophenyl, nitronaphthyl, nitroanthryl, etc.,
(j) cyanoaryl, e.g., cyanophenyl, cyanonaphthyl, cyanoanthryl, etc.,
(k) haloaryl e.g., chlorophenyl, bromophenyl, chloronaphthyl, etc.,
(l) aryl substituted with an acyl group having the formula $$-\overset{\overset{\displaystyle O}{\|}}{C}-R$$

wherein R is hydroxy, halogen e.g., chlorine, bromine, etc., hydrogen, aryl, e.g., phenyl, naphthyl, etc., amino including substituted amino e.g., diloweralkylamino, lower alkoxy having 1 to 8 carbon atoms e.g., butoxy, methoxy, etc., aryloxy e.g., phenoxy, naphthoxy, etc., lower alkyl having 1 to 8 carbon atoms e.g., methyl, ethyl, propyl, butyl, etc.,
(m) alkaryl e.g., tolyl, ethyl phenyl, propyl naphthyl, etc.;

(d) a 2 to 3 membered sulfur, selenium or tellurium bridge joining together any two positions represented by $R_1$ through $R_{13}$;
(e) an aryloxy group e.g. phenoxy, naphthoxy, etc.;
(f) a halogen atom e.g. bromine, iodine, etc.;
(g) an alkoxy group having 1 to 8 carbon atoms such as butoxy, methoxy, etc.;
(h) a nitro group;
(i) a sulfo group;
(j) a thiol group;
(k) a substituted sulfonyl group;
(l) a substituted sulfinyl group;
(m) a hydroxy group;
(n) a cyano group;
(o) an amino group having the formula $$-N\begin{matrix}\nearrow R_{14}\\ \searrow R_{15}\end{matrix}$$

wherein $R_{14}$ and $R_{15}$ are the same or different including hydrogen, lower alkyl having 1 to 8 carbon atoms such as ethyl, propyl, butyl, etc., aryl such as phenyl, naphthyl, etc., halogen e.g. chlorine, bromine, etc.;
(p) substituted acyl such as those having the formula $$-\overset{\overset{\displaystyle O}{\|}}{C}-R_{16}$$

wherein $R_{16}$ is hydroxy, halogen e.g. chlorine, bromine, etc., hydrogen, aryl e.g. phenyl, naphthyl, etc., amino including substituted amino e.g. diloweralkylamino, lower alkoxy having 1 to 8 carbon atoms e.g. butoxy, methoxy, etc., aryloxy e.g. phenoxy, naphthoxy, etc., alkyl e.g., methyl, ethyl, propyl, etc. or
(q) positions of bonding for additional fused aromatic nuclei which may further be substituted by any of the substituents set forth in (a) through (p) above.

Typical compounds defined by III and IV above are set forth in the following Table I.

TABLE I (1) 1,8 dithionaphthalene
(2) 1,8;4,5 tetrathionaphthalene
(3) 1,9 dithioanthracene
(4) 1,9;5,10 tetrathioanthracene
(5) 1,9;4,10 tetrathioanthracene
(6) 1,10 dithiopyrene
(7) 1,10;5,6 tetrathiopyrene
(8) 1,10;2,3 tetrathiopyrene
(9) 1,10;2,3;5,6 hexathiopyrene
(10) 1,10; 2,3;5,6;7,8 octathiopyrene
(11) 3,4 dithioperylene
(12) 3,4;9,10 tetrathioperylene
(13) 5,6 dithiotetracene
(14) 5,6;11,12 tetrathiotetracene
(15) Hexathioanthracene
(16) Hexathiopentacene
(17) Trithioanthracene
(18) Trithiopentacene
(19) 1,8 diselenonaphthalene
(20) 2,8;4,5 tetraselenonaphthalene
(21) 1,9 diselenoanthracene
(22) 1,9;5,10 tetraselenoanthracene
(23) 1,10 diselenopyrene
(24) 1,10;5,6 tetraselenopyrene
(25) 1,10;2,3 tetraselenopyrene
(26) 1,10;2,3;5,6 hexaselenopyrene
(27) 1,10;2,3;5,6;7,8 octaselenopyrene
(28) 3,4 diselenoperylene
(29) 3,4;9,10 tetraselenoperylene
(30) 5,6 diselenotetracene
(31) 5,6;11,12 tetraselenotetracene
(32) Hexaselenoanthracene
(33) Hexaselenopentacene
(34) Triselenoanthracene
(35) Triselenopentacene
(36) 1,8 ditelluronaphthalene
(37) 1,8;4,5 tetratelluronaphthalene
(38) 1,9 ditelluroanthracene
(39) 1,9;5,10 tetratelluroanthracene
(40) 1,9;4,10 tetratelluroanthracene
(41) 1,10 ditelluropyrene
(42) 1,10;5,6 tetratelluropyrene
(43) 1,10;2,3 tetratelluropyrene
(44) 1,10;2,3;5,6 hexatelluropyrene
(45) 1,10;2,3;5,6;7,8 octatelluropyrene
(46) 3,4 ditelluroperylene
(47) 3,4;9,10 tetratelluroperylene
(48) 5,6 ditellurotetracene
(49) 5,6;11,12 tetratellurotetracene
(50) Hexatelluroanthracene
(51) Hexatelluropentacene
(52) Tritelluroanthracene
(53) Tritelluropentacene
(54) 2,9 dimethyl-5,6;11,12 tetrathiotetracene
(55) 2,9 diphenyl-5,6;11,12 tetrathiotetracene Typical semiconductors which belong to the herein described general class are set forth in the following Table II.

TABLE II

| Cation or electron donating moiety derived from Compound No.: | Anion or electron accepting moiety |
|---|---|
| 14 | Thiocyanate. |
| 14 | Bromide. |
| 14 | Nitrate. |
| 14 | Fluoroborate. |
| 14 | Sulfate. |
| 14 | Ferricyanide. |
| 21 | Molybdate. |
| 23 | Tungstate. |
| 25 | Benzoate. |
| 13 | Phthalate. |
| 11 | Terephthalate. |

| Cation or electron donating moiety derived from compound No.: | Anion or electron accepting moiety |
|---|---|
| 3 | Pyromellitate. |
| 9 | Sulfonate. |
| 15 | p-Toluenesulfonate. |
| 17 | 2-naphthoate. |
| 23 | 2-naphthalenesulfonate. |
| 29 | 2,3-naphthalenesulfonate. |
| 34 | 1,4,5,8-naphthalenetetracarboxylate acetate. |
| 19 | Citrate. |
| 23 | Gallate. |
| 35 | Methoxyacetate. |
| 1 | Dichloroacetate. |
| 3 | Acrylate. |
| 14 | Maleate. |
| 14 | Fumarate. |
| 14 | Acetylenedicarboxylate. |
| 14 | Oxalate. |
| 19 | Muconate. |
| 23 | 1-naphthol-3,6-disulfonate. |
| 27 | Barbiturate. |
| 25 | Cyanurate. |
| 30 | 2-thiobarbiturate. |
| 32 | Quinolinate. |
| 34 | Chelidonate. |
| 28 | 2,5-dichloro-3,6-dihydroxy-p-benzoquinone. |
| 26 | Poly(vinyl methyl ether-maleic anhydride). |
| 14 | Polyacrylic acid. |
| 12 | Sulfonated polystyrene. |
| 10 | Poly(methyl methacrylate-methacrylic acid). |
| 11 | Poly(ethylene-maleic acid). |
| 15 | Poly(ethyl acrylate-acrylic acid). |

Semiconductor elements can be prepared with the semiconductors described herein by blending a solution of the semiconductor together with a binder, when necessary or desirable, and coating on or imbibing into a suitable substrate or forming a self-supporting layer. Evaporation of the solvent produces a coating in which the conducting species is dispersed in the polymeric binder. It is also possible to coat a soluble derivative of an insoluble semiconducting material, and then regenerate the latter by heating or chemical treatment of the coating. Another method useful for producing conducting coatings of organic semiconductors is by successive applications of donor and acceptor layers, the semiconductor being formed in the vicinity of the interface. This is also accomplished if the first component of the semiconductor is coated and then exposed to a vapor of the second species. A polymeric acceptor may be coated from a solvent with or without additional polymeric binder and then by overcoating with a soluble derivative of the donor, a semiconducting polymer is obtained.

Preferred binders for use in preparing the semiconductor elements are generally film-forming materials. Materials of this type comprise natural as well as synthetic materials. Typical of these materials are:

(I) Natural resins including gelatin, cellulose ester derivatives such as alkyl esters of carboxylated cellulose, hydroxy ethyl cellulose, carboxy methyl cellulose, carboxy methyl hydroxy ethyl cellulose, etc.;

(II) Vinyl resin including (a) polyvinyl esters such as a vinyl acetate resin, a copolymer of vinyl acetate and crotonic acid, a copolymer of vinyl acetate with an ester of vinyl alcohol and a higher aliphatic carboxylic acid such as lauric acid or stearic acid, polyvinyl stearate, a copolymer of vinyl acetate and maleic acid, a poly(vinylhaloarylate) such as poly(vinyl-m-bromobenzoate), a terpolymer of vinyl butyral with vinyl alcohol and vinyl acetate, a terpolymer of vinyl formal with vinyl alcohol and vinyl acetate, etc.;

(b) vinyl chloride and vinylidene chloride polymers such as a poly(vinylchloride), a copolymer of vinyl chloride and vinyl isobutyl ether, a copolymer of vinylidene chloride and acrylonitrile, a terpolymer of vinyl chloride, vinyl acetate and vinyl alcohol, poly(vinylidene chloride) a terpolymer of vinyl chloride, vinyl acetate and maleic anhydride, a copolymer of vinyl chloride and vinyl acetate, etc.;

(c) styrene polymers such as polystyrene, a nitrated polystyrene, a copolymer of styrene and monoisobutyl maleate, a copolymer of styrene with methacrylic acid, a copolymer of styrene and butadiene, a copolymer of dimethylitaconate and styrene, polymethylstyrene, etc.;

(d) methacrylic acid ester polymers such as a poly (alkylmethacrylate), etc.;

(e) polyolefin ssuch as chlorinated polyethylene, chlorinated polypropylene, etc.;

(f) poly(vinyl acetals) such as a poly(vinyl butyral), etc.; and (g) poly(vinyl alcohol);

(III) Polycondensates including (a) a polyester of 1,3-disulfobenzene and 2,2-bis-(4-hydroxyphenyl)propane;

(b) a polyester of diphenyl-p,p'-disulphonic acid and 2,2-bis(4-hydroxyphenyl)propane;

(c) a polyester of 4,4'-dicarboxyphenyl ether and 2,2-bis (4-hydroxyphenyl)propane;

(d) a polyester of 2,2-bis(4-hydroxyphenyl) propane and fumaric acid;

(e) pentaerythrite phthalate;

(f) resinous terpene polybasic acid;

(g) a polyster of phosphoric acid and hydroquinone;

(h) polyphosphites;

(i) polyester of neopentylglycol and isophtalic acid;

(j) polycarbonates including polythiocarbonates such as the polycarbonate of 2,2-bis(4-hydroxyphenyl) propane;

(k) polyester of isophthalic acid, 2,2-bis-4-($\beta$-hydroxyethaxy)phenyl propane and ethylene glycol;

(l) polyester of terephthalic acid, 2,2-bis-4-($\beta$-hydroxyethoxy)phenyl and ethylene glycol;

(m) polyester of ethylene glycol, neopentyl glycol, terephthalic acid and isophthalic acid;

(n) polyamides;

(o) ketone resins; and (p) phenolformaldehyde resins;

(IV) Silicone resins;

(V) Alkyd resins including styrene-alkyd resins, silicone-alkyd resins, soya-alkyd resins, etc.; and (VI) Polyamides.

Solvents of choice for preparing coating compositions useful in the present invention can include a number of solvents such as alcohols including aliphatic alcohols preferably having 1 to 8 carbon atoms including methanol, ethanol, propanol, isopropanol, etc., aromatic alcohols, polyhydric alcohols, substituted alcohols including 2-methoxyethanol, organic carboxylic acids having 1 to 10 carbon atmos such as formic, acetic, propionic, etc., substituted carboxylic acids, lower dialkyl-sulfoxides such as dimethylsulfoxide, and water. Also included are mixtures of these solvents among themselves or with other organic solvents such as ketones including acetone, 2-butanone, methyl-isobutylketone, cyclohexanone, etc., and esters derived from organic carboxylic acids having 1 to 10 carbon atoms.

In preparing the coating useful results are obtained where the semiconductor is present in an amount equal to at least about 1 weight percent of the coating. The upper limit in the amount of semiconductor present can be widely varied in accordance with usual practice. In those cases where a binder is employed, it is normally required that the semiconductor be present in an amount from about 1 weight percent of the coating to about 99 weight percent of the coating. A preferred weight range for the semiconductor in the coating is from about 10 weight percent to about 60 weight percent.

Coating thicknesses of the semiconductor composition on a support can vary widely. Normally, a coating in the range of about 0.0001 inch to about 0.01 inch before drying is useful for the practice of this invention. The preferred range of coating thickness is in the range from about 0.0002 inch to about 0.0008 inch before drying although useful results can be obtained outside of this range.

Suitable substrates for coating the semiconductor-containing elements can include any of a wide variety of supports, for example, fibers, films, glass, paper, metals, etc.

Because of their chemical and physical properties, the organic semiconductors described herein are readily incorporated into thin films having a surface resistivity of less than $10^{11}$ ohm/square. In accordance with ths nvention, this surface resistivity can be decreased, by up to several orders of magnitude, to a desired value by heating at a temperature from about 50° C. to about 200° C. for a period from about 5 seconds to about 2 hours. The resistivity is substantially independent of relative humidity and remains within this range even in vacuum. As a result of their good electrical properties, these films are useful in preparing a number of articles of manufacture. For example, one such use is in an antistatic photographic film element comprising an inert film support (which may carry a subbing layer to improve adhesion), a conducting layer containing one of the organic semiconductors described herein and a silver halide emulsion layer which is sensitive to electromagnetic radiation. These layers can be arranged having the conducting layer and the emulsion layer on each side of the support, and also both layers can be on the same side, with either one on top of the other. In some cases, it is desirable to include additional layers of insulating polymer which can be incorporated into the element, either below, between or above any of the abovementioned layers.

Another use is in antistatic magnetic tape, comprising the same arrangement of layers as in the above-described photographic film element, with the exception that the photographic emulsion is replaced by a suitable layer of magnetic material.

A further use is in a direct electron recording film element comprising an inert insulating film support (which may carry a subbing layer to improve adhesion), a conducting layer containing one of the organic semiconductors described herein and a layer of emulsion which is sensitive to electron beams. In this case, both layers are placed on one side of the support with either one on top of the other. Also, additional layers of insulating polymer may be incorporated, as in the preceding elements, to provide particular advantages such as improvement of adhesion, elimination of undesirable changes in the electron-sensitivity of the emulsion, etc.

A fourth use is in electrophotographic elements, comprising a conducting layer which contains one of the organic semiconductors described herein. The conducting layer is coated on an inert support, and on top of the conducting layer is a second layer containing a photoconductor. Additional thin layers of insulating polymers may also be included in this case, as in the preceding elements, which may be located below, between or on top of the conducting and photoconducting layers.

Another use is in the preparation of optically transparent conducting elements. These elements have a conducting layer containing an organic semiconductor described herein applied to an insulating inert support. The thickness of the conducting layer is such that the resultant optical density is not more than about 0.5 in the spectral range from 400 to 800 nm. Such an element is used in the manufacture of antistatic windows for electronic instruments, antistatic lenses for cameras, and other optical devices, transparent heating panels, photographic products, etc.

Static-free woven goods also can contain the organic semiconductors described herein. Fibers containing the organic semiconductors can be incorporated in woven goods as the sole component or mixed with non-conducting fibers.

In electronic components, the organic semiconductors can be applied to an insulating support and shaped in any desired way to give passive electronic components such as resistors or capacitors. Also, the organic semiconductors can be incorporated as part of active components such as rectifiers or transistors.

In each of these uses outlined above, the surface resistivity of the coating containing the semiconductor can be closely controlled by the heating techniques described herein.

The complexes described herein are generally prepared by reacting a soluble derivative of one of the substituted polycyclic aromatic hydrocarbons, such as tetrathiotetracene acetate, with either (1) an anion furnishing inorganic material such as an inorganic salt or acid, (2) an anion furnishing organic material such as an organic acid or salt or (3) an anionic polymer. Typical preparations are set forth in U.S. Ser. No. 851,088, filed Aug. 18, 1969 by Perez-Albuerne.

The following examples are included for a further understanding of the invention.

EXAMPLE 1

A semiconductor element having a coating of tetrathiotetracene maleate is prepared in two steps.

First step: An aqueous solution of tetrathiotetracene acetate containing 9.5 mg. of tetrathiotetracene per ml. and 4.3 mg. of poly(vinyl alcohol) per ml. is applied to a subbed polyester support at such a rate that a coverage of 6.31 mg. of tetrathiotetracene per sq. ft. is obtained. The solvent is evaporated by drying with hot air.

Second step: The dry pink coating is then overcoated with an aqueous solution of maleic acid, containing 15 mg. of maleic acid per ml. and 5.76 mg. of poly(vinyl alcohol) per ml. This second coating is carried out on a whirler plate, spinning at 600 r.p.m. for 3 minutes, during which time it is dried with hot air. After drying, the coating is heated to 120° C. for varying times and the surface resistivity measured. The results of these measurements are set forth below.

| Heating time (min.): | Surface resistivity (ohm/square) |
|---|---|
| 0 | $2.5\times10^{10}$ |
| 3 | $4.5\times10^{9}$ |
| 6 | $1.1\times10^{9}$ |
| 9 | $5.7\times10^{8}$ |
| 12 | $3.6\times10^{8}$ |
| 15 | $2.3\times10^{8}$ |
| 21 | $1.1\times10^{8}$ |
| 24 | $8.7\times10^{7}$ |

EXAMPLE 2

A semiconductor element having a coating of tetrathiotetracene phthalate is prepared in a manner similar to that described in Example 1, with the following changes:

First step: The tetrathiotetracene acetate solution contains 2.05 mg. of tetrathiotetracene per ml. and 2.22 mg. of poly(vinyl alcohol) per ml. It is applied in an amount to produce a coverage of 1.09 mg. of tetrathioteracene per sq. ft.

Second step: An aqueous solution of phthalic acid is coated. It contains 1.49 mg. of phthalic acid per ml. and 1.19 mg. of poly(vinyl alcohol) per ml. It is applied at such a rate as to produce a coverage of 1.59 mg. of phthalic acid per sq. ft. This layer is also dried with hot air.

After drying, the element is heated to 120° C. for varying times and the surface resistivity measured. The variation in surface resistivity with heating time is set forth below.

| Heating time (min.): | Surface resistivity (ohm/square) |
|---|---|
| 1.5 | $4.1\times10^9$ |
| 3 | $3.5\times10^9$ |
| 6 | $3.4\times10^9$ |
| 15 | $2.8\times10^9$ |
| 30 | $2.3\times10^9$ |

EXAMPLE 3

A semiconductor element having a coating of tetrathiotetracene oxalate is prepared in the following manner. A solution of tetrathiotetracene oxalate in methanol containing about 10 percent (by volume) of 2-methoxyethanol and about 5 percent (by volume) of n-propyl alcohol is prepared. The concentration of the oxalate is less than 2.6 mg. of tetrathiotetracene per ml. The solution also contains 1.08 mg. of alcohol soluble cellulose butyrate per ml. This coating solution is applied to a subbed polyester support on a whirler plate, spinning at 300 r.p.m. for 3 minutes. The resulting dry coating is heated to 100° C. for varying times and the surface resistivity measured. The variation in surface resistivity with heating time is set forth below.

| Heating time (sec.): | Surface resistivity (ohm/square) |
|---|---|
| 0 | $>10^{12}$ |
| 15 | $2.7\times10^{10}$ |
| 30 | $7.7\times10^9$ |
| 45 | $2.4\times10^9$ |
| 60 | $2.1\times10^9$ |

EXAMPLE 4

A semiconductor element having a coating of tetrathiotetracene gallate is prepared in the following manner. A solution of tetrathiotetracene chloride in methanol, containing about 6 percent (by volume) of 2-methoxyethanol and 6 percent (by volume) of n-propyl alcohol, is prepared. The concentration of the chloride is less than 1.27 mg. of tetrathiotetracene per ml. The solution also contains 1.11 mg. of cellulose butyrate per ml. This coating solution is applied to a subbed polyester support on a whirler plate, spinning at 300 r.p.m. for 5 minutes. On top of the resulting dry coating a solution of gallic acid is coated in an identical manner. This solution contains 2.50 mg. of gallic acid per ml. and 1.11 mg. of alcohol soluble cellulose butyrate per ml. The solvent is methanol with about 6 percent n-propyl alcohol. The resulting dry coating is heated to 120° C. for varying times and the surface resistivity measured. The variation in surface resistivity with heating time is set forth below.

| Heating time (sec.): | Surface resistivity (ohm/square) |
|---|---|
| 0 | $2.5\times10^9$ |
| 3 | $5.4\times10^8$ |
| 5 | $5.0\times10^8$ |
| 10 | $4.4\times10^8$ |

EXAMPLE 5

A semiconductor element having a coating of tetrathiotetracene citrate is prepared in the following manner. A solution of tetrathiotetracene citrate containing 3.18 mg. tetrathiotetracene per ml. and 1.11 mg. of alcohol soluble cellulose butyrate per ml. is prepared. The solvent is methanol containing about 6 percent n-propyl alcohol. This solution is coated on a subbed polyester support on a whirler plate, spinning at 600 r.p.m. for 3 minutes. The element is heated at various temperatures for 3 minutes and the surface resistivity measured. The results of the measurements are set forth below.

| Heating temperature (° C.): | Surface resistivity (ohm/square) |
|---|---|
| Room temperature (not heated) | $2.8\times10^9$ |
| 100° | $4.6\times10^3$ |
| 120° | $1.2\times10^7$ |

An inspection of the data contained in the above examples demonstrates that the surface resistivity of various semiconductor elements can be decreased by heating at various temperatures for varying periods of time.

The invention has been described in detail with particular reference to preferred embodiments therof, but it will be understood that variations and modifications can be effected within the spirit and scope of the invention.

I claim:

1. A process for decreasing the electrical resistivity of an organic semiconductor comprising an electron donor which is derived from a fused polycyclic aromatic hydrocarbon having at least two positions joined by a bridge containing 2 to 4 atoms of a Group VI*a* element and an electron acceptor comprising the step of heating the semiconductor at a temperature of at least 50° C. for at least 5 seconds.

2. The process of claim 1 wherein said semiconductor is heated at a temperature from about 50° C. to about 200° C.

3. The process of claim 1 wherein said semiconductor is heated for a period from about 5 seconds to about 2 hours.

4. A process for decreasing the electrical resistivity of an organic semiconductor having the formula $$(D)_k{}^o(D^{+n})_m(Z^{-p})_q$$

wherein:

- D is a fused polycyclic aromatic hydrocarbon having at least two positions joined by a bridge containing 2 to 4 atoms of a Group VI*a* element;
- Z is an anion;
- $-p$ is the negative charge on each Z anion;
- $q$ represents the number of Z anions and is an integer having a value of 1 to about 6;
- $(D)^o$ is a combined neutral D moiety;
- $+n$ is the charge on each D cation moiety;
- $m$ represents the number of D cation moieties and is an integer having a value of 1 to about 6;
- $k$ represents the number of D neutral moieties and is a number having a value of 0 to about 5;
- the relationship between $+n$, $m$, $-p$ and $q$ being such that $nm$ is equal to $pq$;

comprising the step of heating the semiconductor at a temperature of at least 50° C. for at least 5 seconds.

5. The process of claim 4 wherein said semiconductor is heated at a temperature from about 50° C. to about 200° C.

6. The process of claim 4 wherein said semiconductor is heated for a period from about 5 seconds to about 2 hours.

7. A process for decreasing the electrical resistivity of an organic semiconductor having the formula $$(D)_k{}^o(D^{+n})_m(Z^{-p})_q$$

wherein:

- D is a fused polycyclic aromatic hydrocarbon having at least two positions joined by a bridge containing 2 to 4 atoms of a Group VI*a* element;
- Z is an anion;
- $-p$ is the negative charge on each Z anion;

$q$ represents the number of Z anions and is an integer having a value of 1 to about 6;

$(D)^o$ is a combined neutral D moiety;

$+n$ is the charge on each D cation moiety;

$m$ represents the number of D cation moieties and is an integer having a value of 1 to about 6;

$k$ represents the number of D neutral moieties and is a number having a value of 0 to about 5;

the relationship between $+n$, $m$, $-p$ and $q$ being such that $nm$ is equal to $pq$;

comprising the step of heating the semiconductor at a temperature from about 90° C. to about 130° C. for a period from about 10 seconds to about 1 hour.

8. A process for decreasing the electrical resistivity of a semiconductor element comprising a supporting substrate containing a semiconductor having the formula $$(D)_k{}^o(D^{+n})_m(Z^{-p})_q$$

wherein:

D is a fused polycyclic aromatic hydrocarbon having at least two positions joined by a bridge containing 2 to 4 atoms of a Group VI*a* element;

Z is an anion;

$-p$ is the negative charge on each Z anion;

$q$ represents the number of Z anions and is an integer having a value of 1 to about 6;

$(D)^o$ is a combined neutral D moiety;

$+n$ is the charge on each D cation moiety;

$m$ represents the number of D cation moieties and is an integer having a value of 1 to about 6;

$k$ represents the number of D neutral moieties and is a number having a value of 0 to about 5;

the relationship between $+n$, $m$, $-p$ and $q$ being such that $nm$ is equal to $pq$;

comprising the step of heating the element at a temperature of at least 50° C. for at least 5 seconds.

9. The process of claim 8 wherein said semiconductor element is heated at a temperature from about 50° C. to about 200° C.

10. The process of claim 8 wherein said semiconductor element is heated for a period from about 5 seconds to about 2 hours.

11. A process for decreasing the surface resistivity of a semiconductor element comprising a supporting substrate having coated thereon a layer of tetrathiotetracene maleate comprising the step of heating the element at a temperature from about 90° C. to about 130° C. for a period from about 10 seconds to about 1 hour.

12. A process for decreasing the surface resistivity of a semiconductor element comprising a supporting substrate having coated thereon a layer of tetrathiotetracene phthalate comprising the step of heating the element at a temperature from about 90° C. to about 130° C. for a period from about 10 seconds to about 1 hour.

13. A process for decreasing the surface resistivity of a semiconductor element comprising a supporting substrate having coated thereon a layer of tetrathiotetracene oxalate comprising the step of heating the element at a temperature from about 90° C. to about 130° C. for a period from about 10 seconds to about 1 hour.

14. A process for decreasing the surface resistivity of a semiconductor element comprising a supporting substrate having coated thereon a layer of tetrathiotetracene gallate comprising the step of heating the element at a temperature from about 90° C. to about 130° C. for a period from about 10 seconds to about 1 hour.

15. A process for decreasing the surface resistivity of a semiconductor element comprising a supporting substrate having coated thereon a layer of tetrathiotetracene citrate comprising the step of heating the element at a temperature from about 90° C. to about 130° C. for a period from about 10 seconds to about 1 hour.

References Cited

UNITED STATES PATENTS 3,403,165 9/1968 Matsunaga ------- 252—500 X
3,408,349 10/1968 Matsunaga ------- 252—500 X JOHN T. GOOLKASIAN, Primary Examiner J. C. GIL, Assistant Examiner U.S. Cl. X.R.

260—327 C